(12) United States Patent
McGinn et al.

(10) Patent No.: US 6,944,814 B2
(45) Date of Patent: Sep. 13, 2005

(54) METHOD AND APPARATUS FOR PERFORMING FRAME INTERROGATION

(75) Inventors: Colleen J. McGinn, Atlanta, GA (US); Philip Toms, Atlanta, GA (US)

(73) Assignee: Agere Systems Inc., Allentown, PA (US)

( * ) Notice: Subject to any disclaimer, the term of this patent is extended or adjusted under 35 U.S.C. 154(b) by 575 days.

(21) Appl. No.: 09/862,922

(22) Filed: May 22, 2001

(65) Prior Publication Data

US 2002/0176413 A1 Nov. 28, 2002

(51) Int. Cl.[7] .......................... G06F 11/00; G06F 7/02; H03M 13/00
(52) U.S. Cl. ........................................ 714/819; 714/735
(58) Field of Search ................................ 701/819, 824, 701/735; 714/744, 807, 819; 370/338, 392; 711/144

(56) References Cited

U.S. PATENT DOCUMENTS 5,883,890 A * 3/1999 Okanoue et al. ............ 370/338

6,628,653 B1 * 9/2003 Salim ........................ 370/389

* cited by examiner

*Primary Examiner*—Shelly Chase

(57) ABSTRACT

A method and an apparatus are provided for interrogating bits of a data frame. The apparatus comprises configurable logic that can be reconfigured to enable the apparatus to vary its configuration in accordance with various criteria to make it suitable for use in different domains. The apparatus locates and selects a bit pattern from a data frame for interrogation, compares a comparison bit value to the selected bit pattern to obtain a comparison result, and determines a location to which the comparison result is to be routed. The method relates to the steps of selecting the bit pattern from the data frame, comparing the selected bit pattern to the comparison bit value to obtain the comparison result, and determining the location to which the comparison result is to be routed. The logic of the apparatus is variable to enable the bit pattern to be interrogated to be varied, to enable the comparison bit value to be varied, and to enable the location to which the comparison result is routed to be varied.

27 Claims, 3 Drawing Sheets

METHOD AND APPARATUS FOR PERFORMING FRAME INTERROGATION

The present invention generally relates to communications. More particularly, the present invention relates to interrogating data frames via logic that is reconfigurable to thereby provide flexible solutions for interrogating data frames for purposes such as, for example, implementing various types of communications protocols.

BACKGROUND OF THE INVENTION

An increasing need exists for customisable and flexible solutions for implementing communications protocols, while also meeting ever-increasing speed requirements. The growing need for flexibility in implementing communications protocols stems from changes that are often made to protocol standards in order to meet the demands of technology as it evolves. In this highly competitive market, manufacturers attempt to provide solutions to the market that implement the most current protocols as soon as the standards are finalized.

To date, attempts have been made to meet speed requirements by implementing communications protocols in custom-built ASICs (Application Specific Integrated Circuits). ASIC implementations are typically very fast, low power, and, when manufactured in large enough volumes, very cost-effective. However, since ASICs have fixed hardware architectures, ASIC solutions that have been implemented for these purposes lack the flexibility that is needed to meet changes in protocol standards and technology.

In order to provide cost-effective protocol implementations that are flexible and modifiable, some designers have utilized firmware (FW) in combination with Reduced Instruction Set Computer (RISC) processors. The term firmware typically is used to denote hard coding a computer algorithm in memory. A RISC processor is a processor that uses a relatively small instruction set and that capitalizes on the instructions that are executed most often, while also utilizing optimization to maximise execution speed. Although FW/RISC solutions provide some implementation flexibility, such solutions typically are much slower in speed and higher in power consumption than ASIC solutions.

Recently, some designers have implemented protocols by interfacing a RISC processor with a block of programmable logic, such as field programmable gate arrays (FPGAs). This hybrid combination provides some implementation flexibility and relatively high processing speed because it incorporates the speed benefits associated with hardware and the flexibility benefits associated with firmware. However, the costs associated with using FPGA logic are still high when compared with the costs associated with using mass-produced ASICs. Also, FPGAs typically consume more power and run at lower speeds than ASICs. Furthermore, FPGAs are limited with respect to the speed and resolution with which they can be reprogrammed, which restrains the level of reconfigurability available at real time communications speeds.

Accordingly, a need exists for a high-speed communications protocol implementation solution that is flexible so that it can be easily and quickly modified as existing protocols change or as new protocols are adopted, and that is reconfigurable in real time to meet the needs of communications speeds.

SUMMARY OF THE INVENTION

The present invention provides a method and apparatus for interrogating bits of a data frame. The apparatus comprises logic that can be configured and re-configured to enable the apparatus to vary its configuration in accordance with various criteria to make it flexible for use in different domains and to make it adaptable at high communications speeds. The apparatus of the present invention locates and selects a bit pattern from a data frame for interrogation, compares a comparison bit value to the selected bit pattern to obtain a comparison result, and determines a location to which the comparison result is to be routed. The method of the present invention relates to the steps of selecting the bit pattern from the data frame for interrogation, comparing the selected bit pattern to the comparison bit value to obtain the comparison result, and determining the location to which the comparison result is to be routed. The logic of the apparatus is reconfigurable to enable the bit pattern being located in and selected from the data frame to be varied, to enable the comparison bit value to be varied, and to enable the location to which the comparison result is routed to be varied.

In accordance with the preferred embodiment of the present invention, the apparatus is comprised as an ASIC that receives programming signals from a processor and, if necessary or desirable, reconfigures the logic of the ASIC accordingly to enable one or more of the aforementioned variations to be made. The bit pattern selected from the data frame for interrogation may comprise adjacent or non-adjacent bits in the data frame. In either case, the apparatus provides the ability to control the location and selection of the bits that for the bit pattern from the data frame and of comparing the bit pattern with a comparison bit value. The comparison result can be, but need not be, routed to other similar or identical comparison logic of the apparatus to enable complex comparisons to be performed. The routing of the comparison result is also variable by varying the configuration of routing logic comprised by the apparatus.

Preferably, the apparatus is incorporated into a network interface card (NIC) for performing bit interrogation for the Media Access Control (MAC) layer. The apparatus preferably includes resolution logic that resolves the comparison result into a single digital value. This single digital value can be used as a control signal to control routing of the bits of the data frame to various components of the NIC, such as, for example, decryption and CRC (cyclic redundancy check) components, for processing. In this case, once the NIC has performed the MAC protocol layer processing, the processed data is provided to a host interface device that interfaces the NIC to a host computer.

These and other features and advantages of the present invention will become apparent from the following description, drawings and claims.

DETAILED DESCRIPTION OF THE INVENTION

The method and apparatus of the present invention preferably are implemented in the form of one or more logic blocks of an ASIC that interrogate data frames. In accordance with the preferred embodiment, two or more logic blocks of the same type are comprised within an ASIC and are in communication with each other and collectively interrogate data frames to perform Media Access Control (MAC) layer processing. However, those skilled in the art will recognize that the present invention is not limited to any particular physical implementation, and that hardware implementations other than an ASIC can be used to accomplish the goals of the present invention. The ASIC implementation of the preferred embodiment has been selected due to the advantages mentioned above, including the speed and flexibility that can be achieved by using this type of solution.

However, it should be noted that various functions discussed below as being performed by logic within an ASIC may alternatively be performed in software executed by a processor, such as a microprocessor, for example. It should also be noted that various functions discussed below as being performed by logic within an ASIC may alternatively be performed by a FPGA. Persons skilled in the art will understand the manner in which certain functions can be implemented with these alternative solutions without sacrificing much or any of the performance benefits achieved by using an ASIC to perform those functions.

With reference again to the preferred embodiment, each logic block of the ASIC will be referred to herein as a "Cblock", to denote the tasks that they perform, namely, "comparison" operations. The results of the comparison operations are then used to link the presence of specified bit patterns in an interrogated frame to one or more actions to be performed on the frame. In other words, the results of the comparison operations performed on a given interrogated frame preferably are used to determine further actions that need to be performed on the frame.

Figure 1:
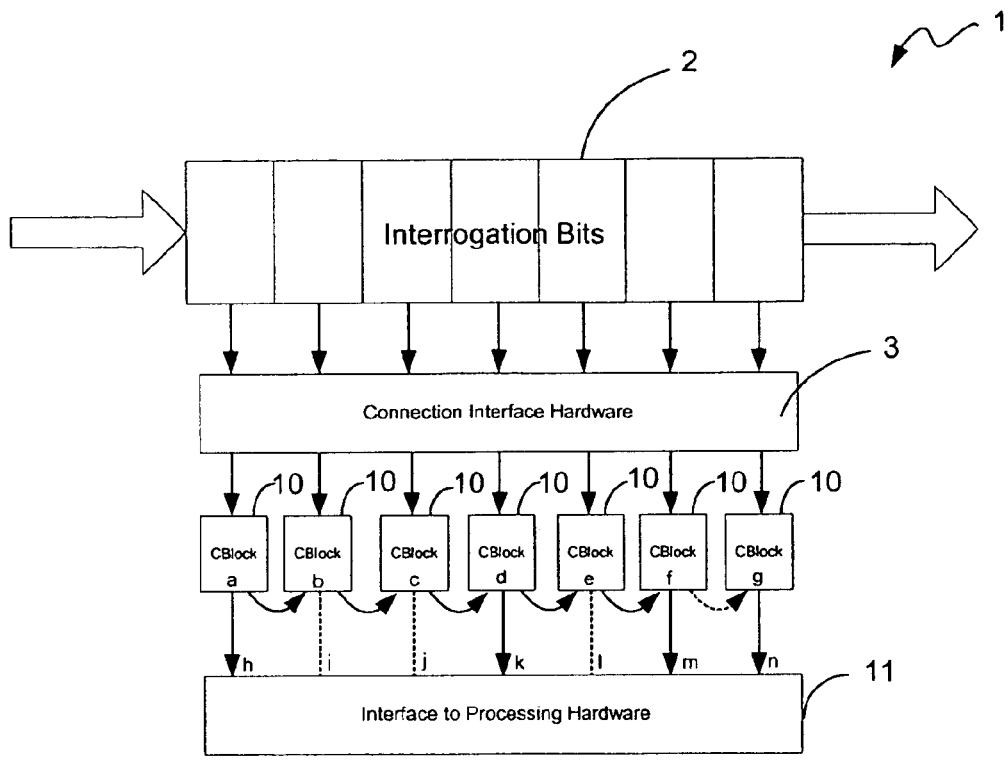
FIG. 1 is a block diagram of the apparatus of the present invention in accordance with the preferred embodiment for interrogating frames via configurable and reconfigurable logic.

FIG. 1 is a block diagram of the apparatus 1 of the present invention for interrogating bits of a data frame in accordance with an exemplary embodiment. In accordance with this exemplary embodiment, the apparatus 1 comprises a register 2 that receives a data frame, or a portion of a data frame, to be interrogated, connection interface hardware 3 that selects bits of the data frame that are to be interrogated and routes the bits to one or more of the Cblocks 10, and interface-to-processing hardware 11. The connection interface hardware 3 can be configured and re-configured in response to control signals (not shown) received thereby (e.g., from a microprocessor) to select a specific bit pattern from the register 2 and to route the selected bit pattern in a manner controlled by the configuration of the connection interface hardware 3 to one or more specific Cblocks of the group of Cblocks 10.

The Cblocks 10 receive control signals (not shown) that are capable of configuring and re-configuring the Cblocks 10, in real time if necessary or desired. The Cblocks 10 perform operations on the bits received by them in a manner controlled by their individual and/or collective configurations. Each of the Cblocks 10 preferably is in communication with one or more of the other Cblocks 10 to enable the comparison results of operations performed by a given Cblock 10 to be passed to one or more of the other Cblocks 10 where further operations may be performed. The comparison results of the Cblocks 10 are output to interface-to-processing hardware 11 where the results may be further processed and/or utilized, as discussed below in detail with reference to FIG. 4.

Figure 3:
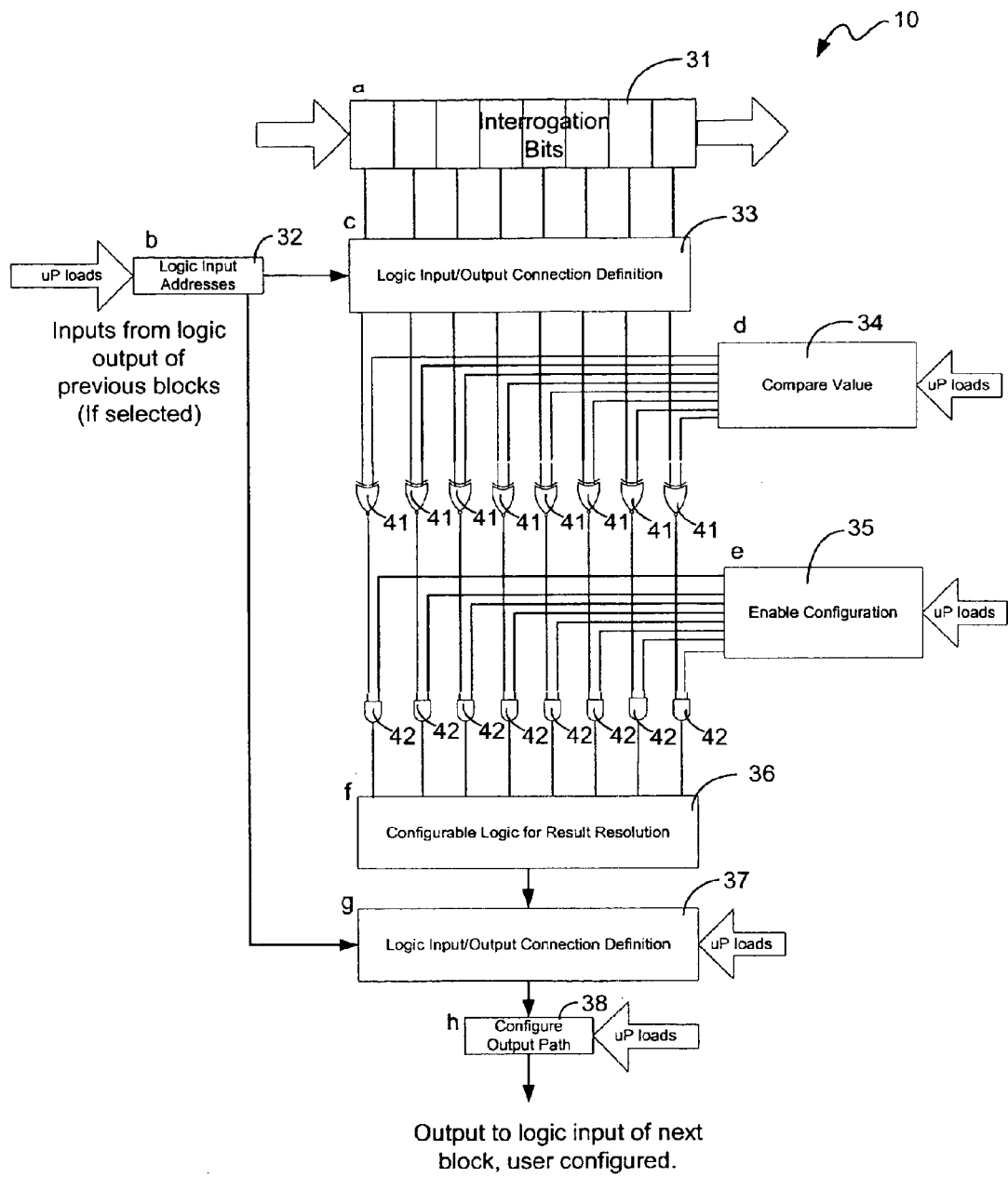
FIG. 3 is a block diagram of a Cblock of the apparatus of the present invention shown in FIG. 1.
Figure 4:
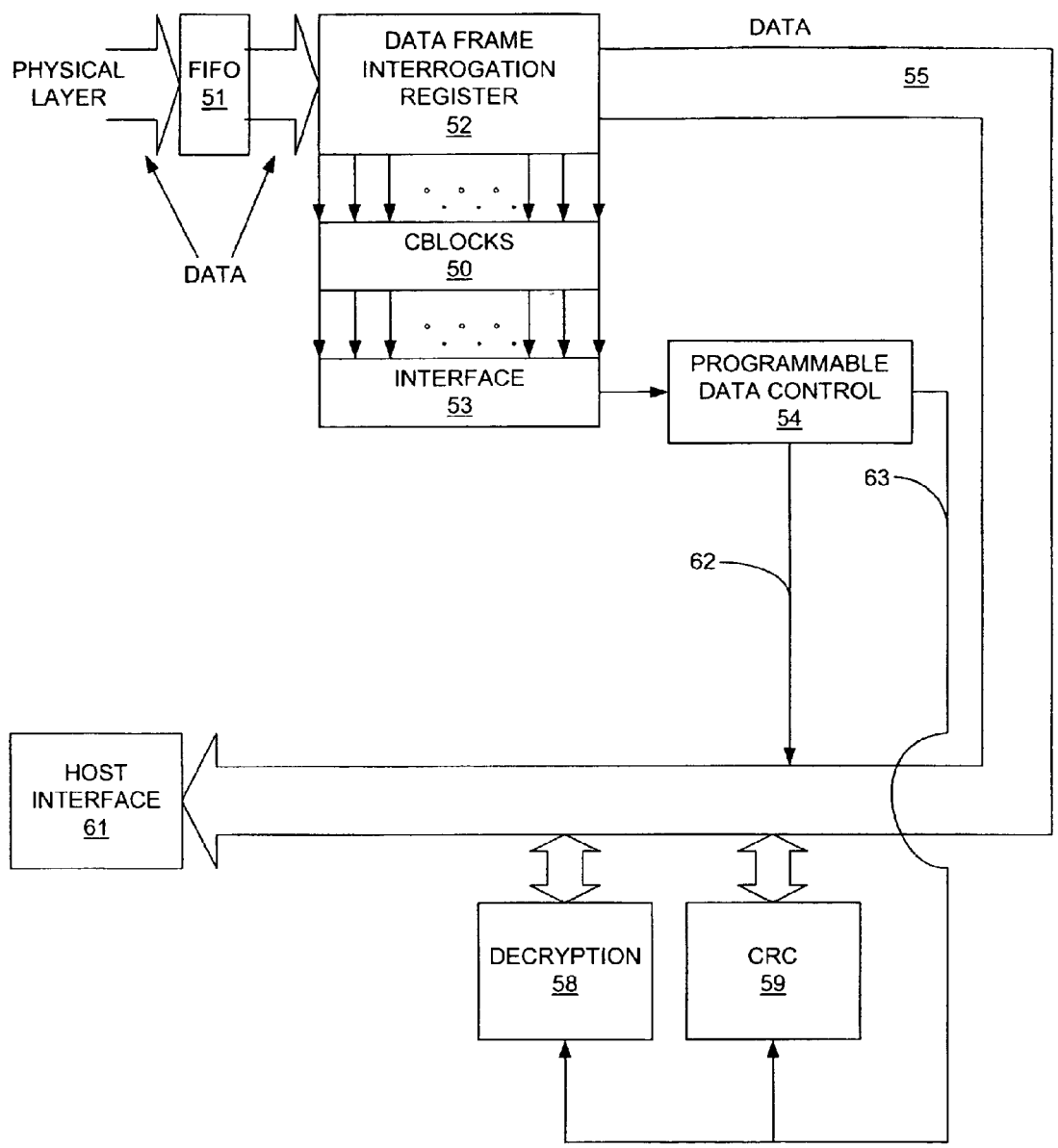
FIG. 4 is a block diagram illustrating the manner in which the apparatus of the present invention shown in FIG. 1 may be utilized to interrogate data frames for Media Access Control (MAC) protocol layer processing.

The connection interface hardware 3, the Cblocks 10 and the interface-to-processing hardware 11 preferably are all comprised within a single ASIC that is capable of being configured and reconfigured. It should be noted that although the register 2, the connection interface hardware 3 and the interface-to-processing hardware 11 are shown is being external to the Cblocks 10, this is not required. For example, each of the Cblocks 10 could comprise its own register and/or connection interface hardware and/or interface-to-processing hardware to enable the tasks performed by these logic blocks to be performed within the Cblocks 10. The manner in which these logical functions are implemented, grouped, etc., within the ASIC is not critical. For example, FIGS. 3 and 4 illustrate the functions of locating and selecting the bit pattern to be interrogated as being performed by logic within each individual Cblock. It should also be noted that the apparatus of the present invention may be viewed as corresponding to a single Cblock 10, to a group of the Cblocks 10, or to one or more of the Cblocks 10 in combination with other logical components, such as, for example, components 2, 3 and 11 shown in FIG. 1.

With reference again to FIG. 1, in accordance with the preferred embodiment of the present invention, the apparatus 1 performs frame interrogation and processing functions for the portion of a communications protocol commonly referred to as the media access control (MAC) network layer. The apparatus 1 is capable of being reconfigured, if necessary, to enable it to perform frame interrogation and other processing functions for different communications protocols. Furthermore, the apparatus 1 of the present invention is not limited to being used solely for these purposes. It will become apparent to those skilled in the art, from the discussion provided herein, that the apparatus 1 can be used for performing virtually any type of bit interrogation for virtually any purpose.

The reconfigurable nature of the architecture of the apparatus 1 facilitates its use in many environments. Generally, the apparatus 1 of the present invention can be configured to perform, or to enable the performance of, a single comparison operation or a combination of comparison operations, the results of which can be used to trigger an action or combination of actions. The apparatus 1 can be configured to compare any field of bits to a bit stream, and to then link the output result to logic internal or external to the apparatus 1, thereby enabling a programmed action or set of actions to be performed. An example of the manner in which the results may be utilized will be discussed below with respect to FIG. 4.

The apparatus 1 can be configured simply to perform variable-length, configurable pattern matching, which is a task that is useful for many purposes, such as image processing, for example. Also, although the present invention preferably is used for the purpose of performing MAC layer protocol bit interrogation, it is also suitable for use in performing bit interrogation for network layers other than the MAC layer, such as at the network routing layer, for example.

In accordance with the preferred embodiment of the present invention, each Cblock 10 comprises logic that is configurable to search for a specific N-bit pattern in a data frame being interrogated. The N-bit pattern may or may not be at a specified location in the data frame. In both cases, the apparatus 1 of the present invention is capable of locating a specific bit pattern, as discussed below in detail with reference to FIG. 3. Also, the bit pattern being searched for in the data frame may be a series of adjacent bits, or it may be non-adjacent bits that are separated by other bits in the data frame. Again, in both cases, the apparatus 1 of the present invention is capable of searching for, locating and interrogating the specific bit pattern.

Essentially, each of the Cblocks 10 can be configured to look for and locate a bit pattern comprised of a combination of bits selected from anywhere in the data frame. For example, each Cblock can be configured to look for a pattern formed by a combination of the $6^{th}$, $10^{th}$, $58^{th}$, $59^{th}$, ..., $109^{th}$ bits in the data frame. The combination of these bits may be selected by a Cblock and compared by the Cblock to a particular template having a particular comparison bit pattern to determine whether the selected bit combination matches the bit pattern of the template. Alternatively, rather than selecting specific bits in the data frame and comparing them to a particular bit template, a Cblock can be configured to compare any or every portion of the data frame being interrogated to a sliding N-bit template to find a bit pattern in the data frame that matches the bit pattern of the sliding N-bit template.

The following is an example of the manner in which Cblocks 10 may be linked together to perform comparison operations. In this example, connections that are not enabled are represented in FIG. 1 with dotted lines and connections that are enabled are represented with solid lines. The dashed and solid lines are labeled h, i, j, k, l and m so that the comparison operations can be easily understood. For simplicity, it is assumed that all of the Cblocks are configured so that outputs of previous blocks that are linked together are linked by a logical AND operation. The logical comparison conditions shown are:

IF a THEN h
IF (a AND b AND c AND d) THEN k
IF (a AND b AND c AND d AND e AND f) THEN m
IF g THEN n.

Of course, this is a very simple example of the manner in which comparison operations may be linked. Much more complex comparison operations may also be performed.

The result from each Cblock comparison operation preferably is used to make decisions regarding the manner in which the data frame will be further processed, as discussed below with reference to FIG. 4. The configurable and re-configurable nature of the Cblocks 10 frees the hardware from being specific to any individual, or particular, data communications protocol, and allows multiple communications protocols to be supported by a single hardware architecture. The manner in which these objectives and advantages are achieved will now be discussed with reference to FIGS. 2–4.

Figure 2:
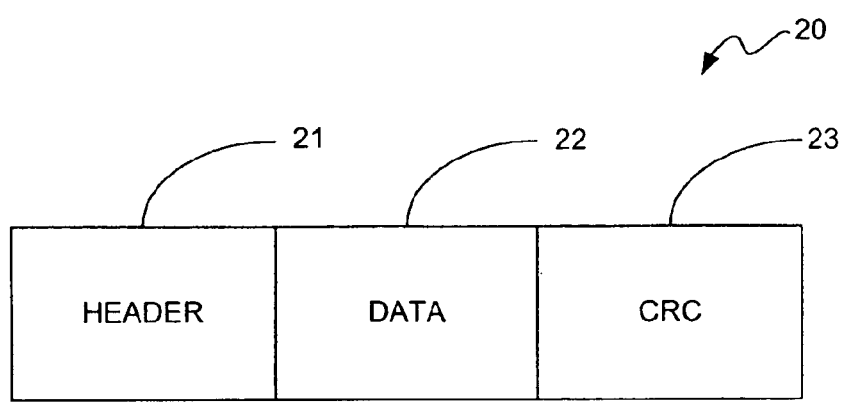
FIG. 2 is a diagram of a frame of data formatted in accordance with the IEEE 802.11 standard governing wireless LAN communications.

A communications application receives a data frame in the form of consecutive bits comprised in a digital bit stream. FIG. 2 generally illustrates a frame format for a frame that conforms to the IEEE 802.11 (b) standard for wireless local area networks (LANs). The frame 20 comprises a header 21, data 22 and a cyclic redundancy check (CRC) 23. The header 21 of a communications frame typically contains configuration information about the contents of the frame. The header 21 is usually a field of bits located at the beginning of the frame 20, and the data 22 and CRC 23 typically follow the header 21. The configuration information in the header 21 is used to determine how the frame, or portions of the frame, such as the data portion 22, are to be processed. The present invention is not limited with respect to frame format.

The Cblocks 10 may also be reconfigured in real time to enable them to identify the presence of a new pattern in the data once the previous pattern has been detected, or in the event that a determination has been made based on a previous interrogation that the desired pattern has changed.

An N-bit stream of interrogation bits is fed to each Cblock 10, preferably in parallel. For example, if the data is received one word (e.g., 16 bits) at a time, each of the received bits can be provided to each of the Cblocks 10 simultaneously. In this case, all of the outputs of the other Cblocks are also available simultaneously at the input to each Cblock, thereby allowing complex deep classification pattern matching to be performed. Preferably, the user determines which bits are to be enabled in each Cblock for use in the pattern matching by programming, or otherwise instructing, a processor, which then configures the Cblocks. The pattern may span a few bits or multiple words.

Each CBlock 10 preferably has one digital output. The value of the output (e.g., a digital one or zero) is conditional on the result of the test for the specific bit pattern. The bit pattern can be the presence of a bit signature in the frame, the logical combination of outputs from other Cblocks, or a combination of both. For example, a Cblock may be configured to determine whether the desired pattern is matched in that Cblock. Alternatively, a Cblock may be configured to determine whether a pattern is matched in a plurality of other Cblocks (e.g., Cblock A and Cblock B and Cblock C), the outputs of which form a pattern that will be output to another Cblock for a matching determination.

If the bit pattern being searched for is discovered in the frame, then the CBlock output would be set TRUE (e.g., a digital one will be asserted). Otherwise, the output would be set FALSE (e.g., a digital zero will be asserted). The compare operation for a bit pattern in a specified location in the data frame may be controlled through pattern select logic comprised by each Cblock. In accordance with the preferred embodiment, the pattern select logic corresponds to chip select (CS) pins that are enabled to cause the bits in the desired location of the data frame to be selected for comparison.

A Cblock 10 in accordance with the preferred embodiment of the present invention will now be discussed with reference to the block diagram of FIG. 3. The block diagram of FIG. 3 is intended to be functionally illustrative of the preferred embodiment, and is not intended to demonstrate the only manner in which the Cblocks 10 may be implemented. Those skilled in the art will understand that the functions performed by each of the Cblocks 10 can be implemented by various types of logic configurations. Block 31 represents a register that receives the bit field for interrogation by the Cblock 10. Block 32 represents a register that contains a "Logic Input Address" (LIA), which is a digital number that indicates which, if any, Cblock outputs are to be selected as inputs to the current Cblock. The LIA register 32 is programmable to enable the contents of the register 32 to be programmably varied.

Cblock outputs may be directly connected to Cblock inputs via selection hardware (not shown) comprised by block 33. This logic block receives a "Logic Input/Output Connection Definition" (LIOCD) that is used to select whether the input to be interrogated corresponds to bits from the data stream (register 31), outputs from other Cblocks (or other hardware), or a combination of both. The LIOCD is used to enable logical combinations of outputs from other Cblocks to be directly combined with bit compares, as if the other Cblock output is one of the bits in the desired pattern for comparison. This logic allows for the result of another comparison to enable or disable the current comparison. This is desired in the case where the output of the current Cblock enables functionality outside the logic of the Cblocks. Block 34 represents a register that holds a specified digital compare value that is to be compared with bits output from logic block 33. This register 34 can be programmably varied to alter the pattern that is to be matched with the bit pattern selected for interrogation. The comparison operations of the Cblock 10 are carried out via the XNOR gates 41, which compare the values output from logic block 33 with the digital comparison value contained in register 34.

Block 35 represents a register that holds an enable mask value and that is programmably variable. This block represents the aforementioned pattern select logic and, as stated above, preferably is implemented through use of a plurality of chip select (CS) pins. Locations in this register that are populated with logical ones enable the comparison results output from the corresponding XNOR gates 41 to be output via the AND gates 42 as valid comparison results to logic block 36. Locations populated with logical zeros would cause the comparison results output from the XNOR gates 41 to be treated as "don't care" values by logic block 36. Therefore, the enable mask held in register 35 selects the bits that are to be compared with the digital comparison value contained in register 34. Controlling the values of the bits of the enable mask controls the selection of bits from the bit stream and/or from one or more other Cblocks that are to be interrogated.

Block 36 represents configurable logic for providing result resolution. This logic resolves the outputs of the bit compares into a single digital result, preferably a binary 0 or 1. This is not necessary, but is preferable because it enables this output to be directly used as a control signal to indicate any processing that is to be performed on the data. Block 37 is a register that holds a "Logic Input/Output Connection Definition" (LIOCD). This register is programmable to specify if and/or how the output of the Cblock 10 is to be logically combined with other Cblock outputs to form complex comparisons. This combining of Cblock results allows the designer to implement conditional execution of actions such as, for example, If (a AND b) OR (c) THEN (take some action). Block 38 represents a "Configure Output Path" register. This register is programmable to specify where the output result of the Cblock 10 is to be directed. The output may be directed to another Cblock, and/or other hardware and/or software for further processing, either within or outside of the ASIC.

As indicated by the "$\mu$ P loads" arrows, each of the blocks 32, 34, 35, 37 and 38 are programmable to control the operations performed by them. This enables variability with respect to the processes of (1) selecting and locating the interrogation bits to be compared, (2) selecting the compare values with which the selected interrogation bits are to be compared, (3) selecting the logical combination of Cblock results to be compared (4) selecting if and/or how the Cblock output result is to be logically combined with the output of one or more other Cblocks and (5) selecting the output path of the Cblock result, i.e., where the result is to be sent. This variability is made possible through the use of reconfigurable logic throughout the Cblock that is programmably controlled by a microprocessor or some other type of processor or computational device that is capable of varying, in real time if desired or necessary, the configuration of the Cblock.

It should be noted that it is not necessary that all of the blocks 32, 34, 35, 37 and 38 be programmable and thus reconfigurable. Any one of these blocks, or any combination of one or more of these blocks, may be reconfigurable while others may not be. For example, making only block 35 reconfigurable would provide great flexibility in selecting the bit pattern to be compared during the frame interrogation. These advantages could be realized even if, for example, blocks 34 and 37 were not reconfigurable. Similarly, making block 34 reconfigurable would provide great flexibility in choosing a bit comparison value, which would be advantageous even if block 35 were not reconfigurable. Of course, the overall reconfigurability of all of these logic blocks is preferable due to the much greater flexibility that overall reconfigurability provides.

As stated above, the reconfigurable nature of the Cblocks 10 and the manner in which one or more Cblocks 10 are able to operate in conjunction with one another enables the apparatus 1 of the present invention to be usable with different communications protocols, as well as for other purposes. The manner in which these features of the present invention can be used to accomplish one particular exemplary practical application, namely, MAC protocol layer processing, will now be described with reference to FIG. 4.

FIG. 4 represents an example of the flow of data from the physical layer to a network interface card (NIC) that is connected to a NIC port of a host computer (not shown). Data from the physical layer preferably is received in a first-in-first-out (FIFO) memory device 51 of the NIC. The data is then loaded into the data frame interrogation register 52 for frame interrogation. Using the FIFO 51 to receive the data from the physical layer enables the data from the physical layer to be buffered initially in the FIFO 51 and then clocked at a particular speed into the register 52. The FIFO 51 is not necessary, but merely exemplifies the manner in which a NIC that incorporates the apparatus of the present invention could be interfaced with the physical layer. For purposes of simplicity, neither timing signals nor a processor are shown in FIG. 4, although NICs typically include a processor and a clock that control the timing of data transfers and processing tasks within the NIC.

Once the data frame has been loaded, the data frame is then interrogated by the Cblocks 50, and the results of the comparison operations are output to interface logic 53. The results of the frame interrogation are then output to programmable data control logic 54, essentially is a frame router. The programmable data control logic 54 controls the routing of the bits contained in the data frame interrogation register 52 over a bus 55 to one of the special function blocks 58 and 59. The programmable data control logic 54 routes selected data bytes from the data frame interrogation register 52 in accordance with control signals received by the programmable data control logic from the interface 53. The interface logic 53 receives the results of the operations performed by the Cblocks and processes the results into control signals that are suitable for use by the programmable control logic 54.

The connections 62 and 63 connecting the programmable data control logic 54 to the bus 55 and to the special function blocks 58 and 59 are intended to indicate that the programmable data control logic 54 sends control signals to the bus 55 and to the special function blocks 58 and 59 that cause the special function blocks 58 and 59 to "grab" the data intended for them from the bus 55 at the appropriate times. However, the programmable data control logic 54 does not control the manner in which the special function blocks process the data that they receive over the bus 55. The special function blocks 58 and 59 perform predetermined processing tasks with the data received by them and then output the results of the processing tasks onto the bus 55 to be sent to the host interface device 61. The host interface device 61 couples the NIC to the host computer (not shown) and formats the data received by it into a form that can be handled by the host computer.

The special functions that are performed by blocks 58 and 59 can best be described with reference again to the frame format shown in FIG. 2. The CRC block 59 performs error checking by processing the header 21 and the data 22 in accordance with a particular algorithm and by comparing the result produced by the algorithm to the CRC 23 contained in the frame. The CRC operations that are typically performed by NICs are well known in the art. The decryption block 58 processes the data portion 22 of the frame in accordance with a predetermined decryption algorithm to decrypt the encoded data contained in the frame.

It should be noted that although the example of FIG. 4 only demonstrates the flow and processing of data in the direction from the physical layer to the host interface (i.e., the logical link layer), the frame interrogation apparatus of the present invention is also capable of processing and controlling the flow of data in the opposite direction, i.e., from the host interface (i.e., the logical link layer) to the physical layer.

As stated above, the use of the apparatus of the present invention discussed with reference to FIG. 4 is merely exemplary and is not intended to exclusively demonstrate the usefulness of the apparatus. It can be seen from this example that the apparatus provides great flexibility with respect to the manner in which bits are interrogated. Therefore, the apparatus is suitable for use in performing frame interrogation for many purposes, although it is particularly well suited for use in communications protocol processing. Those skilled in the art will understand that modifications can be made to the embodiments discussed herein that are within the scope of the present invention. For example, although XNOR and AND gates are shown in FIG. 3, those skilled in the art will understand that there are many logical equivalents that can be substituted in place of those gates.

What is claimed is:

1. An apparatus for interrogating a data frame, the data frame comprising a plurality of bits, the apparatus comprising:

first logic, the first logic being configured to select a particular bit pattern in the data frame for interrogation;

second logic, the second logic being configured to compare a selected bit comparison value to said bit pattern to produce a comparison result, wherein the second logic is reconfigurable to enable said bit comparison value to be altered;

third logic, the third logic being configured to determine a location to which the comparison result is to be routed, and wherein one of said first, second and third logic is reconfigurable;

fourth logic, the fourth logic being configured to resolve said comparison result into a first single digital value and to output the first single digital value to the third logic for routing by the third logic; and complex comparison logic, the complex comparison logic being configured to compare the first single digital value from the fourth logic to a second single digital value to produce a complex comparison result.

2. The apparatus of claim 1, wherein said first logic is reconfigurable to enable said first logic to alter the particular bit pattern selected from the data frame for interrogation.

3. The apparatus of claim 2, wherein the first logic is reconfigurable in real time.

4. The apparatus of claim 1, wherein the second logic is reinfigurable in real time.

5. The apparatus of claim 1, wherein said third logic is reconfigurable to enable the location, to which the comparison result is routed to be altered.

6. The apparatus of claim 5, wherein the third logic is reconfigurable in real time.

7. The apparatus of claim 1, further comprising:

fifth logic, the fifth logic being configured to select a particular bit pattern in the data frame for interrogation;

sixth logic, the sixth logic being configured to compare a selected bit comparison value to said particular bit pattern selected by the fifth logic to produce a comparison result; and seventh logic, the seventh logic being configured to determine a location to which the comparison result produced by the sixth logic is to be routed, wherein one of said fifth, sixth and seventh logic is reconfigurable.

8. The apparatus of claim 7, wherein said fifth logic is reconfigurable to enable said fifth logic to alter the particular bit pattern selected from the data frame by the fifth logic for interrogation.

9. The apparatus of claim 7, wherein the sixth logic is reconfigurable to enable said bit comparison value to be altered.

10. The apparatus of claim 7, wherein said seventh logic is reconfigurable to enable the location to which the comparison result is routed to be altered.

11. The apparatus of claim 7, wherein said fifth logic is reconfigurable in real time to enable said fifth logic to alter, in real time, the particular bit pattern selected from the data frame by the fifth logic for interrogation.

12. The apparatus of claim 7, wherein said sixth logic is reconfigurable in real time in real time to enable said bit comparison value to be altered in real time.

13. The apparatus of claim 7, wherein said seventh logic is reconfigurable in real time to enable the location to which the comparison result is routed to be altered in real time.

14. The apparatus of claim 7, further comprising:

eighth logic, the eighth logic being configured to resolve said comparison result produced by said sixth logic into a single digital value and to output the single digital value from the eighth logic to the seventh logic for routing by the seventh logic.

15. The apparatus of claim 14, further comprising ninth logic, the ninth logic being configured to compare the single digital value received by the fourth logic with the single digital value received by the eighth logic to produce a complex comparison result.

16. The apparatus of claim 14, wherein the first, second, third, fourth, fifth, sixth and seventh logic are comprised in an application specific integrated circuit (ASIC).

17. The apparatus of claim 16, wherein the ASIC receives programming signals from a programmable processor, and wherein the first, second, third, fifth, sixth and seventh logic are re-configurable via the programming signals received by the ASIC.

18. The apparatus of claim 16, wherein the apparatus is utilized for interrogating bits data frames that have been formatted in accordance with a particular communications protocol and transmitted to said apparatus.

19. The apparatus of claim 1, wherein the apparatus is utilized for interrogating bits data frames that have been formatted in accordance with a particular communications protocol and transmitted to said apparatus.

20. The apparatus of claim 19, wherein the apparatus is incorporated into a network interface device.

21. A method for interrogating a data frame, the data frame comprising a plurality of bits, the method comprising the step of:

selecting a particular bit pattern in the data frame for interrogation;

comparing a selected bit comparison value to said bit pattern to produce a comparison result, wherein the bit comparison value can be programmably altered;

determining a location to which the comparison result is to be routed, wherein one of the steps of selecting, comparing and determining is performs by logic that is reconfigurable to thereby enable one of said bit pattern, said bit comparison value and said location to be programmably altered;

resolving said comparison result into a first single digital value; and comparing the first single digital value to a second single digital value to produce a complex comparison result.

22. The method of claim 21, wherein the particular bit pattern selected from the data frame for interrogation can be programmably altered in real time.

23. The method of claim 21, wherein the bit comparison value can be programmably altered in real time.

24. The method of claim 21, wherein the location to which the comparison result is routed can be programmably altered in real time.

25. The method of claim 24, further comprising the step of:

prior to determining step, resolving said comparison result into single digital value such that the comparison result that is routed is the single digital value.

26. The method of claim 25, wherein the method is performed by an application specific integrated circuit (ASIC) that receives programming signals from a programmable processor, and wherein the programming signals programmably alter the particular bit pattern selected from the data frame for interrogation, the selected bit comparison value compared to said bit patten, and the location to which the comparison result is routed.

27. The method of claim 26, wherein the ASIC is incorporated into network interface card and is utilized for interrogating bits of data frames that have been formatted in accordance with a particular communications protocol.

* * * * *